United States Patent
Huang et al.

(10) Patent No.: US 9,471,186 B2
(45) Date of Patent: Oct. 18, 2016

(54) METHOD FOR IMPROVING LINEARITY OF TOUCH SYSTEM COORDINATES

(71) Applicant: ORISE TECHNOLOGY CO., LTD., Hsinchu (TW)

(72) Inventors: Hsin-Mao Huang, Hsinchu (TW); Chih-Hung Kung, Miaoli County (TW); Hsiang-Cheng Yu, Hsinchu (TW); Shih-Hsin Huang, Taoyuan County (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 262 days.

(21) Appl. No.: 14/048,544

(22) Filed: Oct. 8, 2013

(65) Prior Publication Data
US 2014/0118297 A1    May 1, 2014

(30) Foreign Application Priority Data
Oct. 25, 2012    (TW) .............................. 101139492 A

(51) Int. Cl.
*G06F 3/044*  (2006.01)
*G06F 3/023*  (2006.01)
*G06F 3/0488*  (2013.01)
*G06F 3/041*  (2006.01)

(52) U.S. Cl.
CPC .............. *G06F 3/044* (2013.01); *G06F 3/0236* (2013.01); *G06F 3/0418* (2013.01); *G06F 3/04883* (2013.01); *G06F 3/04886* (2013.01); *G06F 2203/04104* (2013.01)

(58) Field of Classification Search
CPC ...................................................... G06F 3/044
See application file for complete search history.

(56) References Cited

U.S. PATENT DOCUMENTS

| | | | | |
|---|---|---|---|---|
| 8,902,174 B1* | 12/2014 | Peterson | ............... | G06F 3/0416 178/18.03 |
| 9,081,450 B1* | 7/2015 | Mohindra | ............... | G06F 3/044 |
| 2005/0226505 A1* | 10/2005 | Wilson | .................. | G06F 3/0425 382/180 |
| 2008/0158185 A1* | 7/2008 | Westerman | ........... | G06F 3/0488 345/173 |
| 2008/0309629 A1* | 12/2008 | Westerman | ............. | G06F 3/038 345/173 |
| 2011/0055729 A1* | 3/2011 | Mason | .................. | G06F 3/0425 715/753 |
| 2011/0148801 A1* | 6/2011 | Bateman | ................. | G06F 3/044 345/174 |

(Continued)

OTHER PUBLICATIONS

Gonzalez et al., "Digital Image Processing" 2nd Edition, pp. 617-626, 2002 by Prentice-Hall, Inc., Upper Saddle River, New Jersey, USA.

*Primary Examiner* — Quan-Zhen Wang
*Assistant Examiner* — David Lee
(74) *Attorney, Agent, or Firm* — Bacon & Thomas, PLLC

(57) ABSTRACT

A method for improving linearity of touch system coordinates first reads two-dimensional raw data of a capacitive touch panel. Next, it reads a pixel and adjacent pixels of the pixel from the two-dimension raw data. Then, it determines whether the value of the pixel is great than a pre-determined threshold. If the value of the pixel is not greater than the pre-determined threshold, it then determines whether there is a value of the adjacent pixels is greater than the pre-determined threshold. If there is no value of the adjacent pixels greater than the pre-determined threshold, it sets the value of the pixel to a pre-determined value. Otherwise, it reserves the value of the pixel in order to increase the linearity of two-dimensional raw data so as to avoid the interference of noise to the two-dimensional raw data.

8 Claims, 15 Drawing Sheets

(56) References Cited

U.S. PATENT DOCUMENTS

| | | | |
|---|---|---|---|
| 2011/0148821 A1* | 6/2011 | Ahn | G06F 3/0425 345/175 |
| 2011/0175837 A1* | 7/2011 | Westerman | G06F 3/038 345/173 |
| 2012/0007821 A1* | 1/2012 | Zaliva | G06F 3/03547 345/173 |
| 2012/0062474 A1* | 3/2012 | Weishaupt | G06F 3/0416 345/173 |
| 2013/0241890 A1* | 9/2013 | Sharma | G06F 3/0426 345/175 |

* cited by examiner

Touch position

|    | S1 | S2 | S3 | S4  | S5  | S6  | S7 | S8 | S9 |
|----|----|----|----|-----|-----|-----|----|----|----|
| D1 | 1  | 2  | 5  | 5   | 7   | 4   | 5  | 6  | 10 |
| D2 | 3  | 7  | -7 | -8  | -4  | 7   | 5  | 3  | 12 |
| D3 | 4  | 8  | 6  | 41  | 97  | 120 | 44 | 2  | 0  |
| D4 | 9  | 7  | 5  | 99  | 150 | 144 | 70 | 7  | 3  |
| D5 | 8  | 4  | -5 | 76  | 161 | 133 | 82 | 3  | 2  |
| D6 | 3  | 1  | 4  | 30  | 55  | 10  | -8 | 4  | 1  |
| D7 | 7  | 2  | 1  | 2   | 5   | 7   | 1  | 2  | -5 |
| D8 | 6  | 5  | -1 | 31  | 50  | 17  | 9  | 2  | 1  |
| D9 | -9 | 6  | 4  | -10 | -23 | -15 | -7 | 3  | 0  |

Neglecting those smaller than threshold=80

FIG. 6(C) (Prior art)

|    | S1 | S2 | S3 | S4  | S5  | S6  | S7 | S8 | S9 |
|----|----|----|----|-----|-----|-----|----|----|----|
| D1 | 1  | 2  | 5  | 5   | 7   | 4   | 5  | 6  | 10 |
| D2 | 3  | 7  | -7 | -8  | -4  | 7   | 5  | 3  | 12 |
| D3 | 4  | 8  | 6  | 41  | 97  | 120 | 44 | 2  | 0  |
| D4 | 9  | 7  | 5  | 99  | 150 | 144 | 70 | 7  | 3  |
| D5 | 8  | 4  | -5 | 76  | 161 | 133 | 82 | 3  | 2  |
| D6 | 3  | 1  | 4  | 30  | 55  | 10  | -8 | 4  | 1  |
| D7 | 7  | 2  | 1  | 2   | 5   | 7   | 1  | 2  | -5 |
| D8 | 6  | 5  | -1 | 31  | 50  | 17  | 9  | 2  | 1  |
| D9 | -9 | 6  | 4  | -10 | -23 | -15 | -7 | 3  | 0  |

Noise

Generation of noise points when threshold is reduced

FIG. 6(D) (Prior art)

| -1 | 1 | 2 | 4 | 1 | 7 | 5 | 7 | 7 |
|---|---|---|---|---|---|---|---|---|
| 7 | -5 | 2 | 14 | 3 | 3 | 16 | 15 | 8 |
| 3 | 2 | -7 | 21 | 102 | 91 | 82 | 3 | 8 |
| 8 | 8 | 10 | 61 | 99 | 150 | 70 | 6 | 6 |
| 1 | -4 | 13 | 33 | 81 | 61 | 32 | 4 | 7 |
| 7 | 5 | 81 | 102 | 120 | 91 | -2 | 9 | 3 |
| -10 | 1 | 91 | 150 | 130 | 99 | 10 | 5 | -3 |
| 2 | 6 | 47 | 81 | 89 | 22 | -4 | 6 | 5 |
| 2 | 6 | 12 | 31 | 41 | 11 | 1 | 4 | 3 |
| 1 | 8 | 6 | 5 | 7 | 18 | 2 | 6 | 7 |
| 5 | 1 | 2 | -8 | 17 | 6 | -5 | 6 | 5 |
| 1 | 2 | 1 | 6 | 4 | 8 | 6 | 5 | 6 |

FIG. 13

METHOD FOR IMPROVING LINEARITY OF TOUCH SYSTEM COORDINATES

BACKGROUND OF THE INVENTION

1. Field of the Invention

The present invention relates to the technical field of touch panels and, more particularly, to a method for improving linearity of touch system coordinates.

2. Description of Related Art

The operation principle of touch panels is to sense a voltage, a current, an acoustic wave or an infrared when a finger or other medium touches on a touch screen, so as to detect the coordinates of touching points. For example, a resistive touch panel uses the voltage difference between upper and lower electrodes to calculate the location where a force is applied, to thereby detect the touching point. A capacitive touch panel uses the current or the voltage originated from capacitance changes in a static electricity combination of transparent electrodes in row and column with human body to detect the touching coordinate.

Mutual capacitance sensing scheme is known as projected capacitive sensing techniques. When there is a touch occurred, the mutual capacitance sensing indicates that a capacitance coupling is generated between two adjacent conductor lines.

The way of driving the mutual capacitive touch panel is to sense a magnitude change of mutual capacitance Cm, so as to determine whether the object is approached to the touch panel. The mutual capacitance Cm is not a physical capacitor but a mutual capacitance between the conductor line in a first direction and the conductor line in a second direction. FIG. 1 is a schematic diagram of a typical mutual capacitance sensing. As shown in FIG. 1, the drivers 110 are arranged on the first direction (Y), and the sensors 120 are arranged on the second direction (X). At the upper half of the first period of time T1, the drivers 110 drive the conductor lines 130 in the first direction and use the voltage Vy_1 to charge the mutual capacitance (Cm) 140. At the lower half of the first period of time T1, all sensors 120 sense voltages (Vo_1, Vo_2, ... , Vo_n) on the conductor lines 150 in the second direction so as to obtain n data. Accordingly, m*n data can be obtained after m driving periods.

Such a mutual capacitance sensing has the advantages as follows:

(1) It is easily determined whether a touch is generated from a human body since a signal generated from a floating conductor is in a different direction than a grounded conductor.

(2) Every touch point is indicated by a real coordinate, and the real position of each point can be found when multiple points are concurrently touched, so that such a mutual capacitance sensing can easily support the multi-touch applications.

Also, there are some disadvantages as follows:

(1) A single image raw data has an amount of n×m, which is relatively large.

(2) A one-by-one scanning is operated in a selected direction. For example, when there are 20 conductor lines in the first direction (Y), the sensing operation is performed 20 times for obtaining a complete image raw data. Also, due to the large amount of data, the time required for converting a sensed signal from analog into digit is relatively increased.

(3) Due to the large amount of data, the power consumption is thus increased on data processing.

The mutual capacitance sensing technique is typically used in a specific capacitive touch panel. By two-dimensional (X direction and Y directional) driving and sensing, it is able to obtain two-dimensional voltage change related to capacitors from the capacitive touch panel. The voltage change is known as raw data, and the raw data may include variation caused by the influences of touch and environmental noise.

The raw data has to be processed by certain algorithm or interpolation method so as to compute the touch coordinate, thereby determining the position of the touch panel at which the user touches. In the prior art, for processing the raw data, a threshold is typically configured to determine whether there is effective touch data.

As shown in FIG. 2, it determines the touch area based on whether the raw data is greater than the threshold. That is, all the raw data with values greater than 80 are determined to be a touch area.

However, such a prior art may cause a serious problem, i.e., the linearity of the raw data and whether the sensing value is excellent or not are greatly influenced by the electrode pattern of the capacitive touch panel. FIG. 3 schematically illustrates the non-linearity displayed in the prior art, which uses a general electrode pattern in cooperation with the threshold determination method. From FIG. 3, it is known that the linearity of such a prior method is poor.

In addition, the electrode pattern design of the capacitive touch panel has a great influence to the values of the raw data. FIG. 4(A) to FIG. 4(C) schematically illustrate how the electrode pattern influences the values of the raw data, in which the slash area stands for a user touch area. When the touch area moves from right to left, it is obvious to have relatively large sensing value when the sensing lines (such as S1-S5 in the figure) in the vertical direction are touched. When there is no touch, the corresponding value is greatly reduced. Therefore, whenever a finger goes over the sensing lines, the values of raw data are dramatically changed, and thus it is known that the values of the raw data are greatly influenced by the electrode pattern. If the threshold determination is further employed to determine whether there is effective touch data and thus to compute the touch coordinate in the prior, it is likely to cause a ladder-like touch coordinate non-linearity exhibition as shown in FIG. 3.

FIG. 5 shows the data actually measured by the prior art, which schematically illustrates the track of touch points obtained when a finger or a mechanic object slightly contacts and crosses a touch panel. The horizontal axis and vertical axis respectively represents the corresponding positions of the touch panel. As shown in FIG. 5, the prior art may cause a ladder-like non-linearity exhibition when the touch position passes through the sensing lines.

To solve the problem, a direct approach is employed to reduce the threshold for increasing the linearity. However, such an approach may cause the generation of noise points. FIG. 6(A) to FIG. 6(D) schematically illustrate the process with reduced threshold, wherein FIG. 6(A) shows a touch position of a finger, FIG. 6(B) shows the values of the obtained raw data, FIG. 6(C) shows the slash part that is determined to be touch position when the threshold is set to be 80, and FIG. 6(D) shows the slash part that is determined to be touch position when the threshold is reduced to be 30, while the number of noise points is increased.

That is, the design of threshold is very difficult. If the threshold is too high, it will be hard to determine the touch control, resulting in unsatisfactory linearity in subsequent coordinate conversion. On the other hand, if the threshold is too low, the linearity exhibition can be preserved but it is likely to be influenced by noise interference, resulting in the occurrence of many unpredicted coordinate points in addition to the specific touch position.

FIG. 7 schematically illustrates a continuous observation of raw data of a certain pixel at an intersection of X-axis and Y-axis on a touch panel for a period of time, in which the horizontal axis is time axis and the vertical axis is raw data and output data. A threshold is defined to determine whether there is touch data. If the threshold is defined to be smaller (as indicated by the solid line), raw data of higher linearity can be preserved but it is likely to be influenced by noises (as indicated in the rectangular box), resulting in occurrence of noise points due to erroneous triggering. On the contrary, if the threshold is defined to be larger (as indicated by the dotted line), it is able to ensure that data is not interfered by noises, but the linearity of raw data is lost. In FIG. 7, the determination of whether there is touch data depends only on the threshold. When the threshold is defined on the dotted line, the de-noise capability is high but the linearity is obviously sacrificed. On the other hand, when the threshold is defined on the solid line, the linearity is increased but the de-noise capability is decreased.

Furthermore, the aforementioned method may exhibit different linearity due to different electrode patterns on the touch panel. Some touch panel may have a specifically designed electrode pattern to increase the linearity and sensing value. However, not all touch control system manufacturers can adapt such a specifically designed electrode pattern and the problems still exist. Therefore, it is desired to provide a method for improving linearity of touch system coordinates.

SUMMARY OF THE INVENTION

The object of the present invention is to provide a method for improving linearity of touch system coordinates, which can increase the linearity of raw data in touch control and prevent the raw data from noise interference, thereby providing excellent touch efficiency while using the general electrode pattern.

To achieve the object, there is provided a method for improving linearity of touch system coordinates applied in a capacitive multi-touch system including a capacitive touch panel and a control device. The method comprises the steps of (A) the control device reading two-dimensional raw data of the capacitive touch panel; (B) the control device reading a target pixel of the two-dimensional raw data and pixels adjacent to the target pixel; (C) the control device determining whether pixel value of the target pixel is greater than a predetermined value; (D) when the pixel value of the target pixel is not greater than the predetermined value, the control device further determining whether at least one of the pixels adjacent to the target pixel has a pixel value greater than the predetermined value; (E) when none of the pixels adjacent to the target pixel has a pixel value greater than the predetermined value, the pixel value of the target pixel is set to be a first setting value; (F) the control device determining whether all pixels of the two-dimensional raw data have been processed and, if no, executing step (B); and (G) when all pixels of the two-dimensional raw data have been processed, the control device performing a feature point capture on the two-dimensional raw data and, based on captured feature points, dividing the two-dimensional raw data into at least one touch area which is assigned with an identification code.

Other objects, advantages, and novel features of the invention will become more apparent from the following detailed description when taken in conjunction with the accompanying drawings.

BRIEF DESCRIPTION OF THE DRAWINGS

FIG. 6(A) to FIG. 6(D) schematically illustrate the process with reduced threshold;

FIG. 13 schematically illustrates the processing to the two-dimensional raw data;

DETAILED DESCRIPTION OF THE PREFERRED EMBODIMENT

Figure 8:
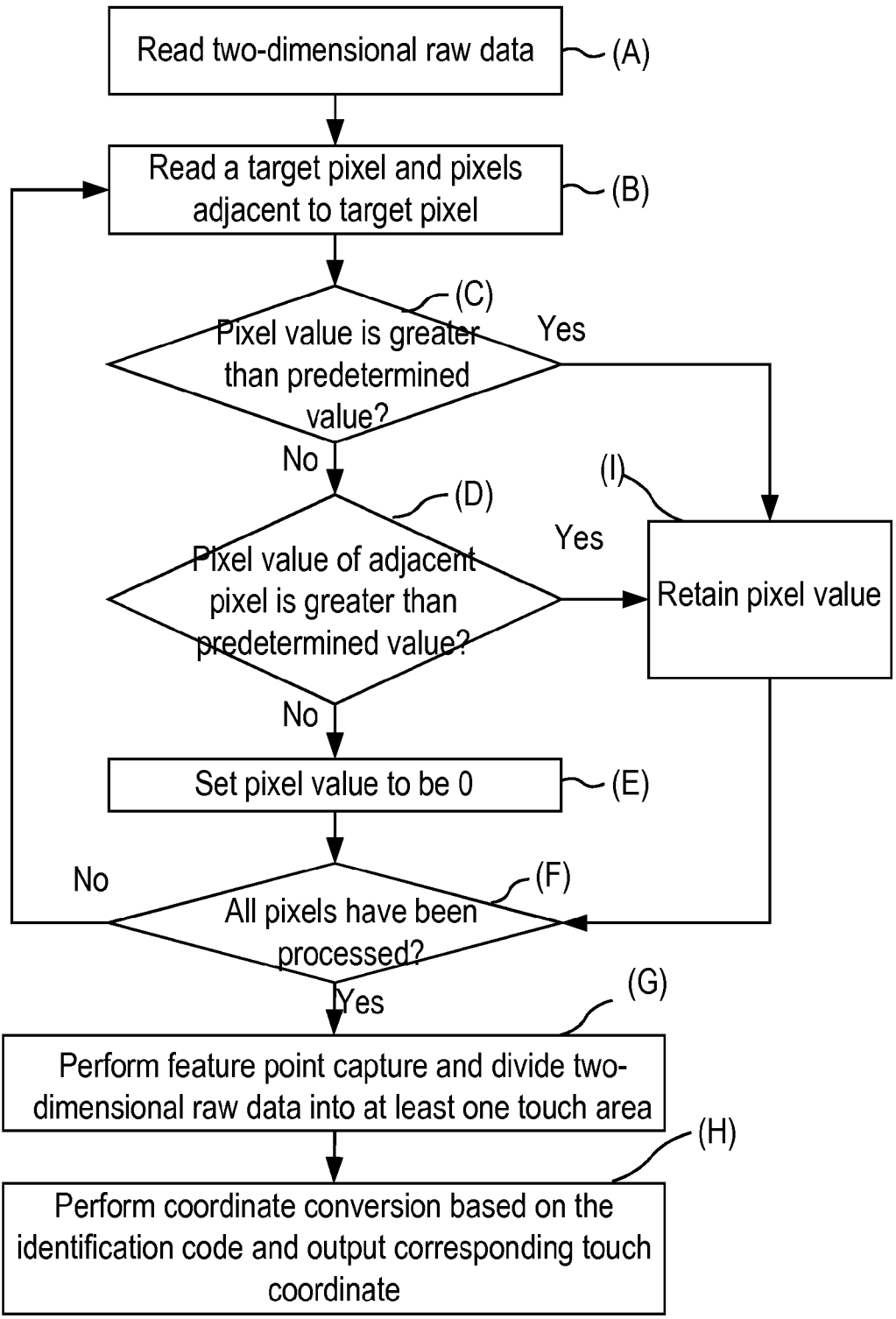
FIG. 8 is a flow chart of the method for improving linearity of touch system coordinates in accordance with the present invention.
Figures 9, 10:
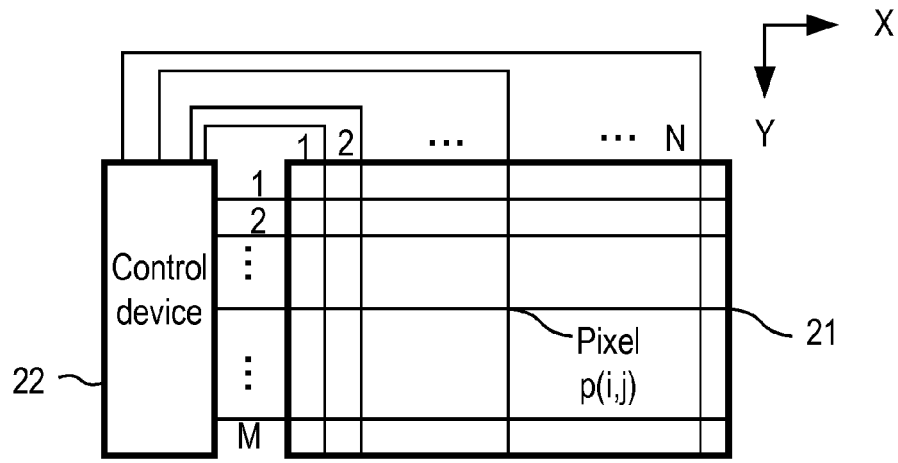
FIG. 9 shows a capacitive multi-touch system in which the method for improving linearity of touch system coordinates is executed.
FIG. 10 schematically illustrates the two-dimensional raw data in accordance with the present invention.

FIG. 8 is a flow chart of the method for improving linearity of touch system coordinates in accordance with the present invention. The method is executed in a capacitive multi-touch system as shown in FIG. 9. The capacitive multi-touch system includes a capacitive touch panel 21 and a control device 22. The capacitive touch panel 21 includes M first conductor lines 31 arranged in a first direction (X-direction) and N second conductor lines 32 arranged in a second direction (Y-direction), wherein the first direction is perpendicular to the second direction, and M and N are positive integers respectively. Each first conductor line 31 and each second conductor line 32 have an intersection corresponding to a pixel P(i, j) of raw data of the touch panel 21, where i and j are respectively an index in X-direction and an index in Y-direction.

In step (A) of the method, the control device reads the two-dimensional raw data of the capacitive touch panel 21. The control device 22 obtains values of capacitance change from the capacitive touch panel 21. The capacitance change is two-dimensional data corresponding to coordinates formed by intersecting X-axis and Y-axis. FIG. 10 schematically illustrates the two-dimensional raw data in accordance with the present invention. In FIG. 10, "A" and "B" stand for two touch positions. The two-dimensional raw data is obtained by mutual capacitance sensing technique. The two-dimensional raw data has M×N pixels, in which i is in the range of 0 to (M−1), and j is in the range of 0 to (N−1).

Figure 11:
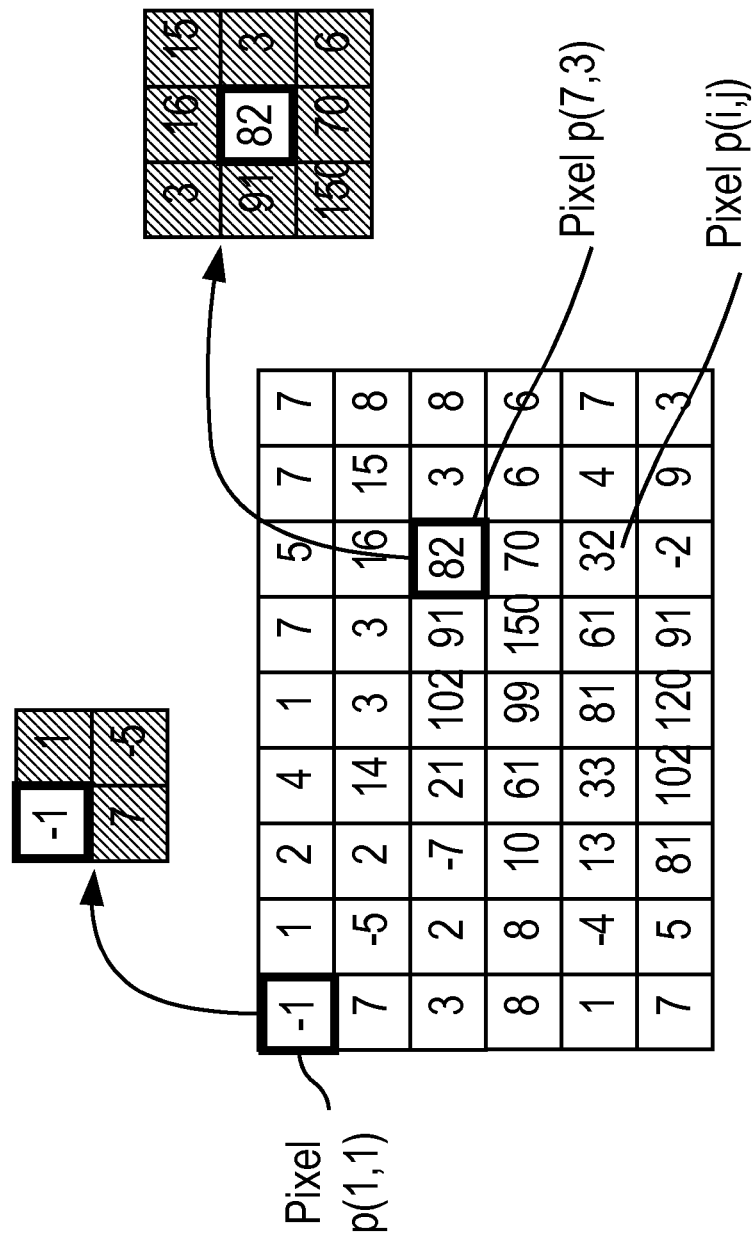
FIG. 11 schematically illustrates the processing to a target pixel in accordance with the present invention.

In step (B), the control device reads one pixel of the two-dimensional raw data and its adjacent pixels. FIG. 11 schematically illustrates the processing to a pixel p(i, j) in accordance with the present invention, in which pixels adjacent to the pixel p(i, j) are sequentially scanned to observe the values and relations of the pixels adjacent to the pixel p(i, j). As shown in FIG. 11, the data in bold rectangular box stands for the pixel position in consideration and the data in slash rectangular box stands for the pixels adjacent to the current pixel. For example, the distribution of adjacent 8 pixels in FIG. 11 is first discussed and the range of adjacent pixels may be extended based on the actual requirement. That is, when the pixel is p(i, j), the adjacent pixels are p(i−1, j−1), p(i, j−1), p(i+1, j−1), p(i−1, j), p(i+1, j), p(i−1, j+1), p(i, j+1), p(i+1, j+1), where i and j are each an index.

In step (C), the control device 22 determines whether the pixel value of the pixel p(i, j) is greater than a predetermined value. As shown in FIG. 11, if the predetermined value is 80, for the pixel p(1, 1) with a pixel value of −1 and the pixel p(7, 3) with a pixel value of 82, the pixel value of 82 is greater than the predetermined value and thus step (I) is executed subsequently, and the pixel value of −1 is not greater than the predetermined value and thus step (D) is executed subsequently for further determining whether it is necessary to retain the pixel value of the pixel p(1, 1).

In step (D), when the pixel value of the pixel p(i, j) is not greater than the predetermined value, it further determines whether at least one of the pixels adjacent to the pixel p(i, j) has a pixel value greater than the predetermined value and, if yes, step (I) is executed.

Figure 12:
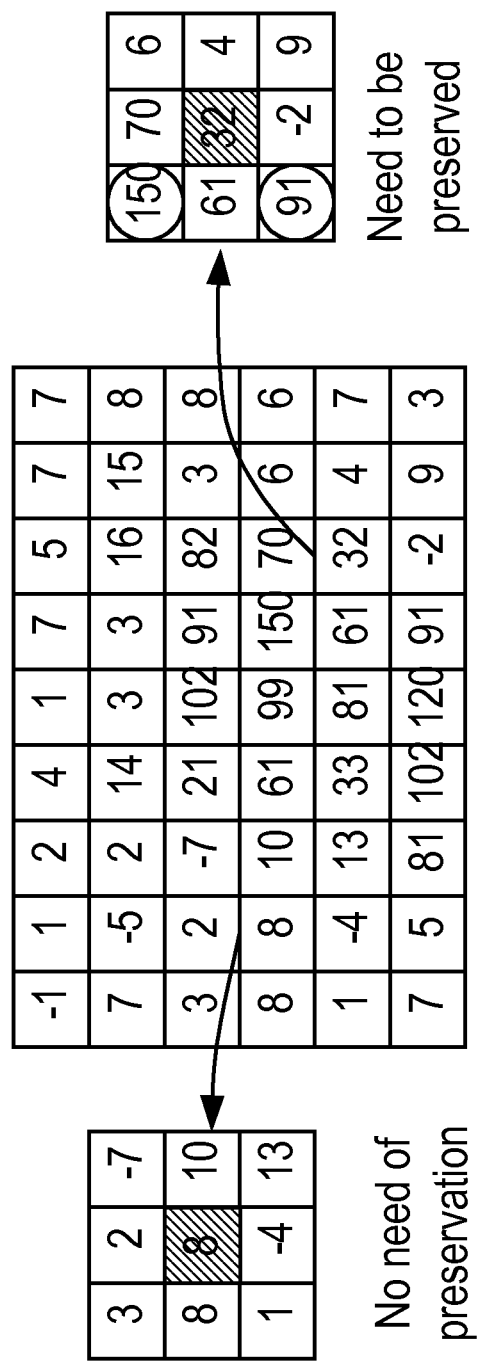
FIG. 12 schematically illustrates the processing to those pixels adjacent to the target pixel.

FIG. 12 schematically illustrates the processing to those pixels adjacent to the pixel p(i, j). In step (D), it determines whether any one of those pixels adjacent to the pixel p(i, j) in consideration has a pixel value greater than predetermined value and, if yes, it indicates that the pixel p(i, j) in consideration will influence coordinate linearity exhibition so that the existence of the pixel is necessary and step (I) is executed. Taking the pixel with a pixel value of 32 as an example, there are two adjacent pixels having pixel values (150 and 91) greater than 80 and thus the pixel with pixel value of 32 has to be preserved. On the contrary, if none of the pixels adjacent to the pixel p(i, j) in consideration has a pixel value greater than the predetermined value, it indicates that the pixel p(i, j) in consideration does not influence coordinate linearity exhibition so that the existence of the pixel is not necessary and step (E) is executed. Taking the pixel with a pixel value of 8 as an example, there is no adjacent pixel having pixel value greater than 80 and thus the pixel with pixel value of 8 has not to be preserved.

In step (E), the pixel value of the pixel is set to be a first setting value, which is 0 for example.

In step (F), it determines whether all pixels of the two-dimensional raw data have been processed and, if no, step (B) is executed again to process the next pixel.

Figure 13:
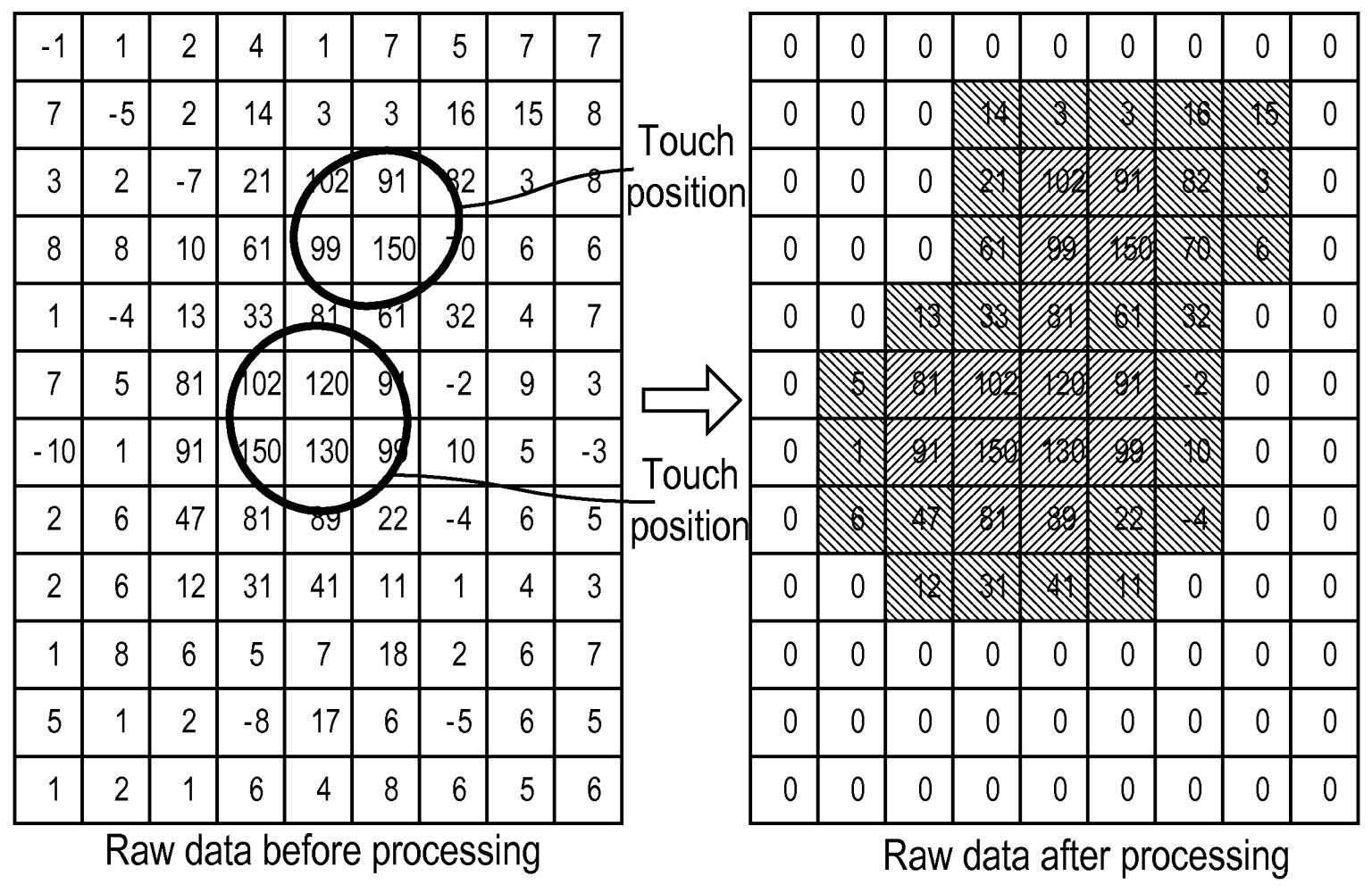

Step (F) determines whether the two-dimensional raw data has been completely scanned. If a complete scanning is achieved, the result as shown in FIG. 12 is obtained. FIG. 13 schematically illustrates the processing to the two-dimensional raw data. As shown in FIG. 13, the pixel values of some pixels marked by backslash (for example the pixel with a pixel value of 14) are retained in the executing process of the present invention, so as to increase the linearity, and some pixels marked by slash (for example the pixel with a pixel value of 91), indicating that their pixel values are greater than the predetermined value, are retained. If step (F) determines that the two-dimensional raw data has not yet been completely scanned, the process continues to execute step (B) for processing the next pixel.

Figure 14:
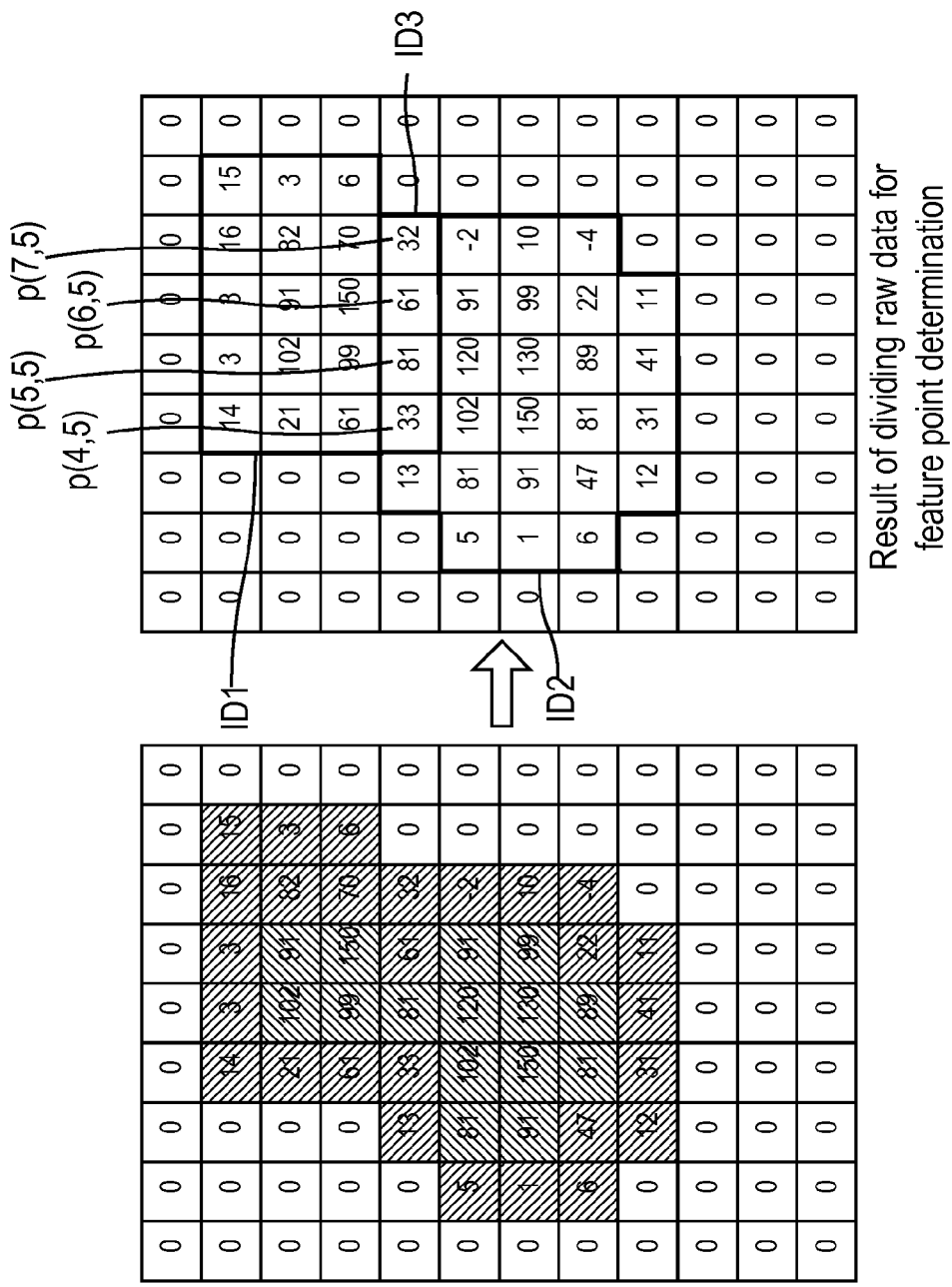
FIG. 14 schematically illustrates a feature point capture for the two-dimensional raw data.

Step (G) is executed, when step (F) determines that all pixels of the two-dimensional raw data have been processed, to perform a feature point capture on the two-dimensional raw data. Based on the captured feature points, the two-dimensional raw data is divided into at least one touch area which is assigned with an identification code. FIG. 14 schematically illustrates the feature point capture for the two-dimensional raw data. As shown in FIG. 14, the two-dimensional raw data is divided into three touch areas, which are respectively assigned with identification codes ID1, ID2 and ID3.

In step (H), based on the identification code, the touch area is performed with coordinate conversion so as to output a corresponding touch coordinate. As shown in FIG. 14, the ID3 area is a common area of the ID1 area and ID2 area, and ID1 area and ID2 area should be considered in proceeding with coordinate conversion. A known first-order momentum method can be employed to perform coordinate conversion on the at least one touch area. Taking the ID3 area in FIG. 14 as an example, the coordinates of the pixels in ID3 area are (4,5), (5,5), (6,5) and (7,5), which have pixel values of 33, 81, 61 and 32, respectively. Therefore, the X-coordinate is 5 (=[4×44+5×81+6×61+7×32]/[33+81+61+32]=1127/207=5.44≈5), and the Y-coordinate is 5 (=[5×44+5×81+5×61+5×32]/[33+81+61+32]=1035/207=5). The touch coordinates of the other areas also can be determined by the first-order momentum method, and thus a detailed description therefore is deemed unnecessary. Alternatively, in addition to the first-order momentum method, other similar methods can also be used to compute the touch coordinate.

In step (I), when it determines that the pixel value of the pixel is greater than the predetermined value, the pixel value of the pixel is retained and step (F) is then executed.

Figure 1:
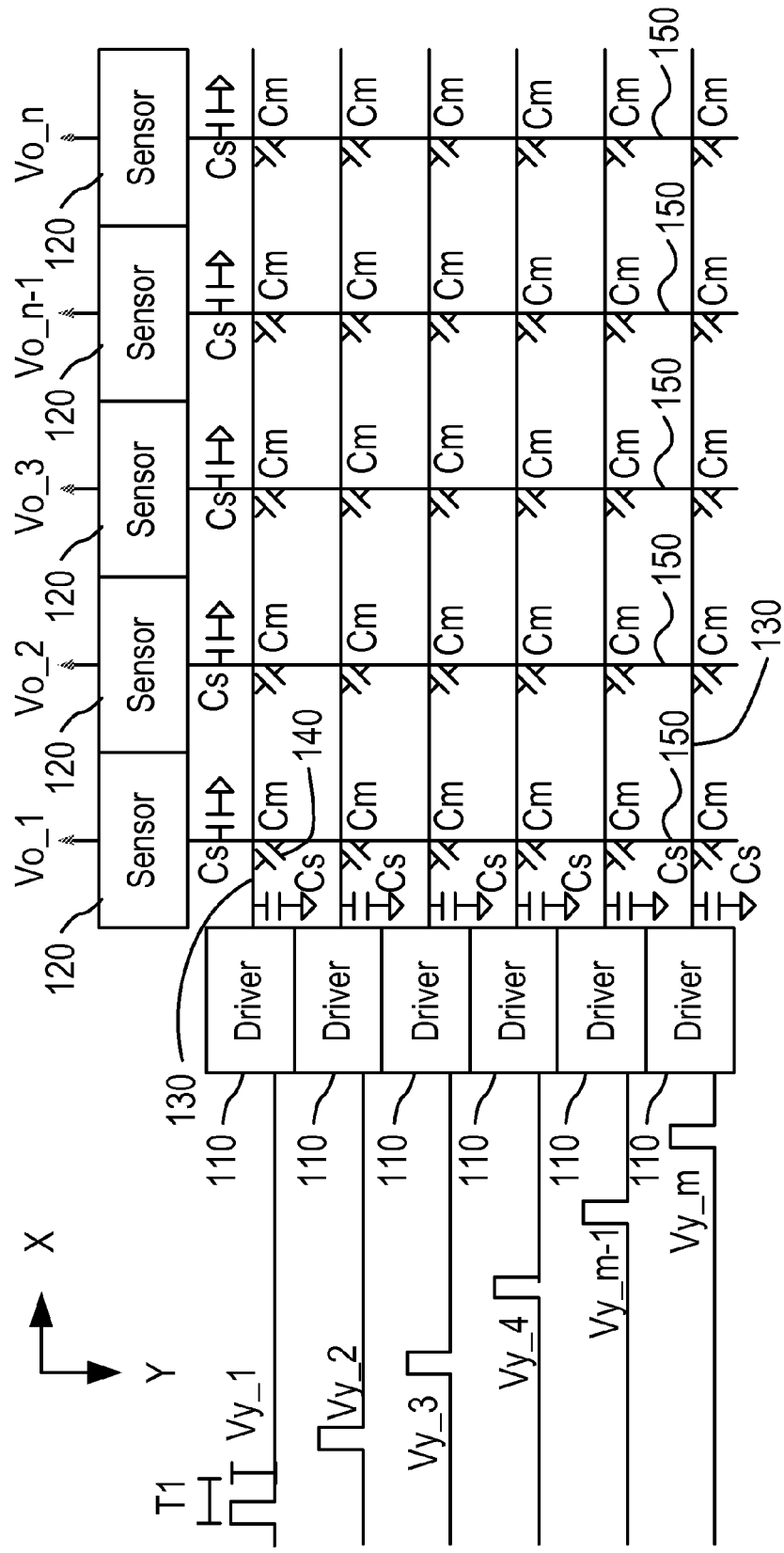
FIG. 1 is a schematic diagram of a typical mutual capacitance sensing.
Figure 2:
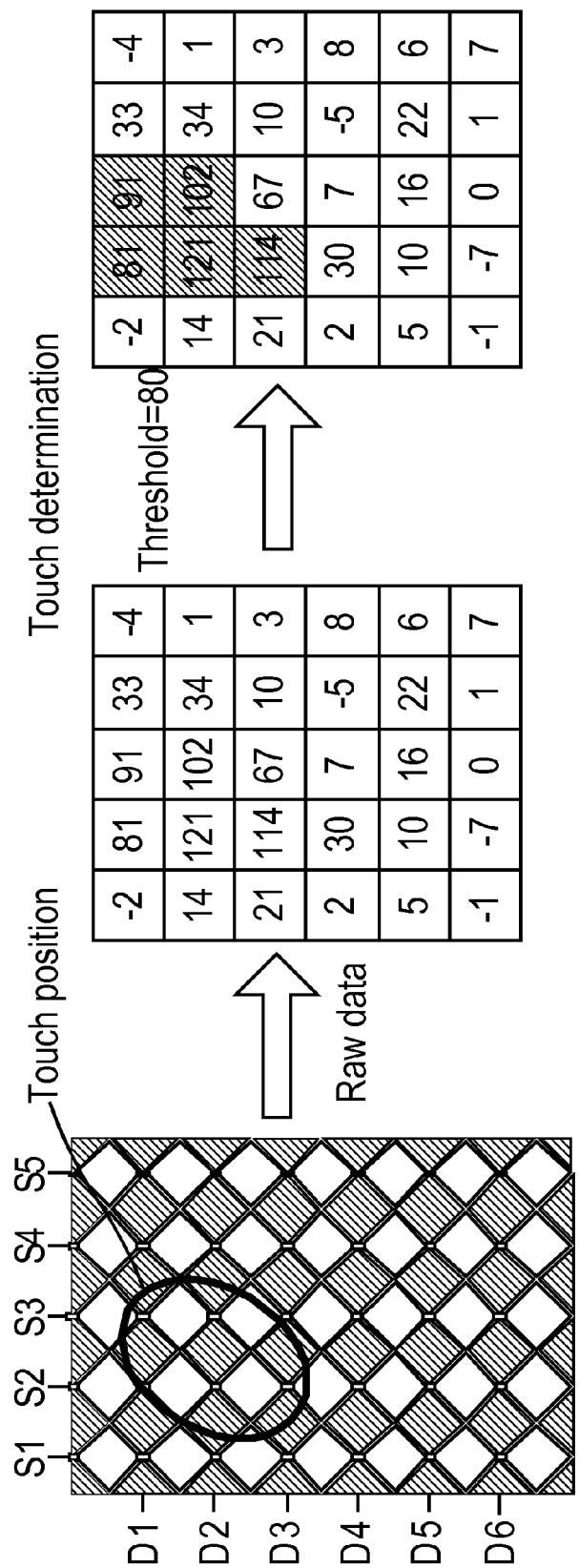
FIG. 2 schematically illustrates how to determine the touch position in the par art.
Figure 3:
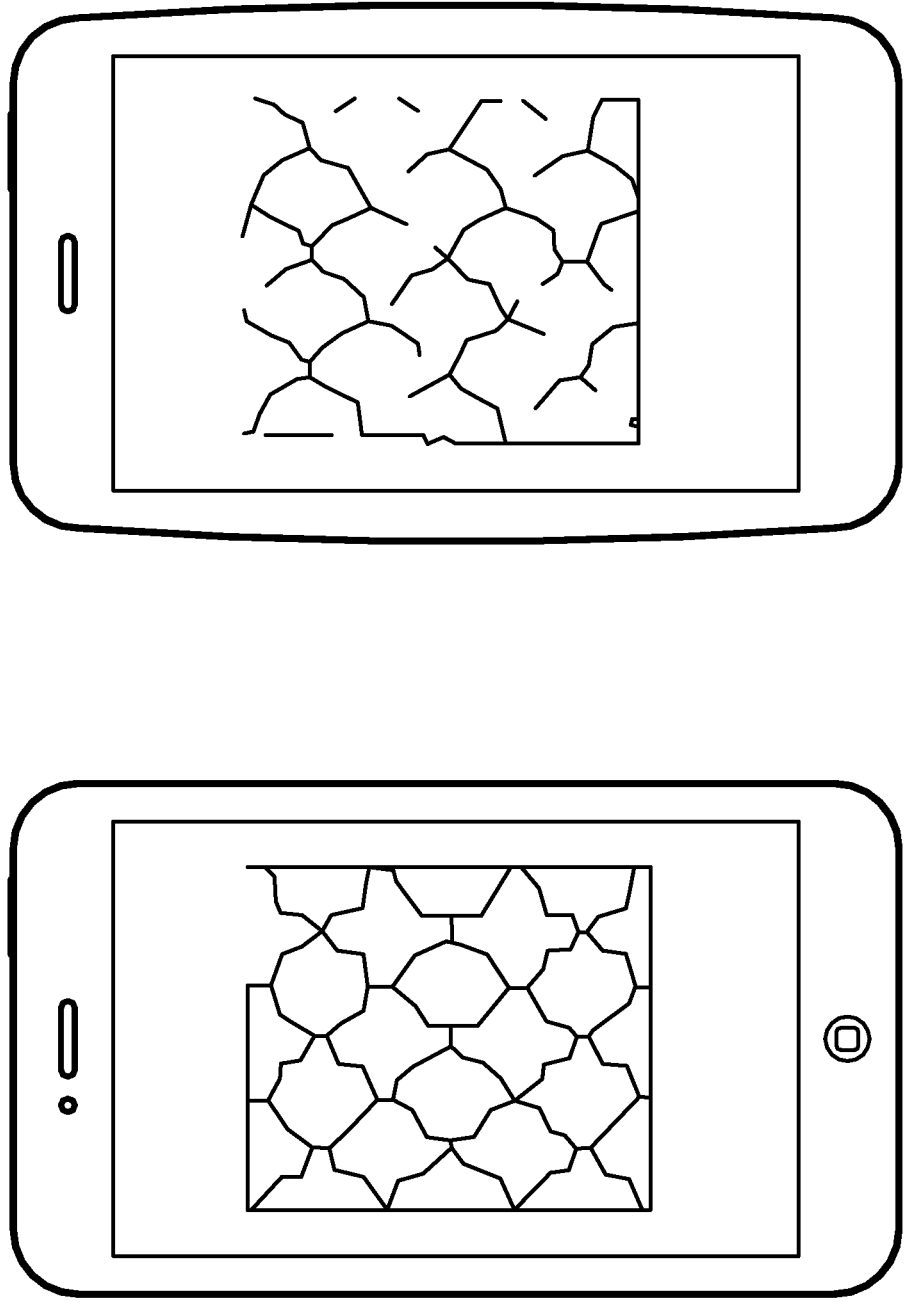
FIG. 3 schematically illustrates the non-linearity displayed in the prior art.
Figure 4A:
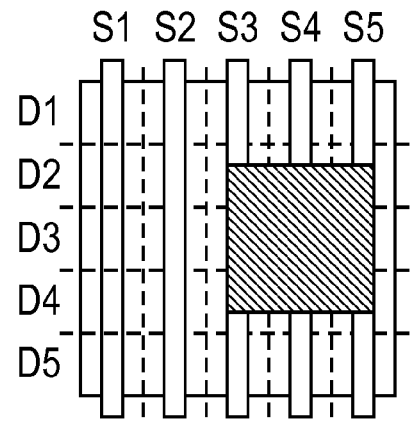
FIG. 4(A) to FIG. 4(C) schematically illustrate how the electrode pattern influences the values of the raw data.
Figure 4B:
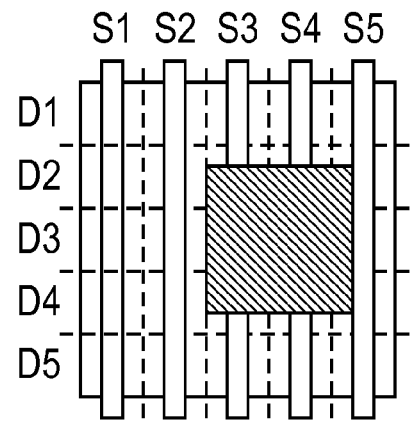
Figure 4C:
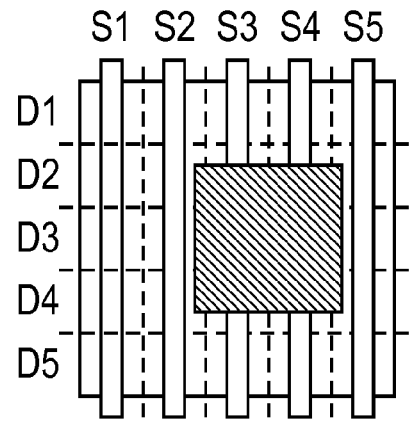
Figure 5:
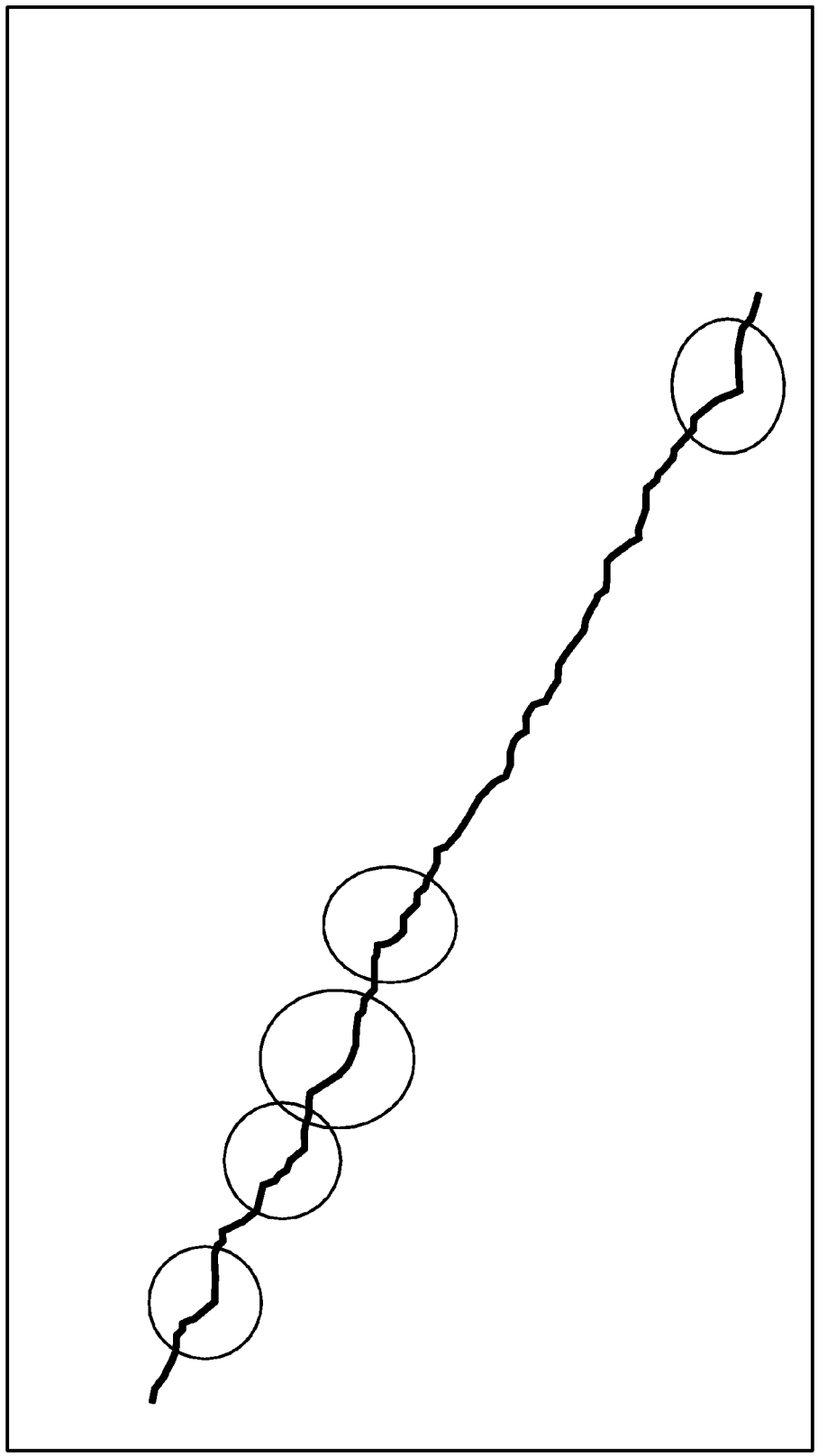
FIG. 5 shows the data actually measured by the prior art.
Figures 6A, 6B:
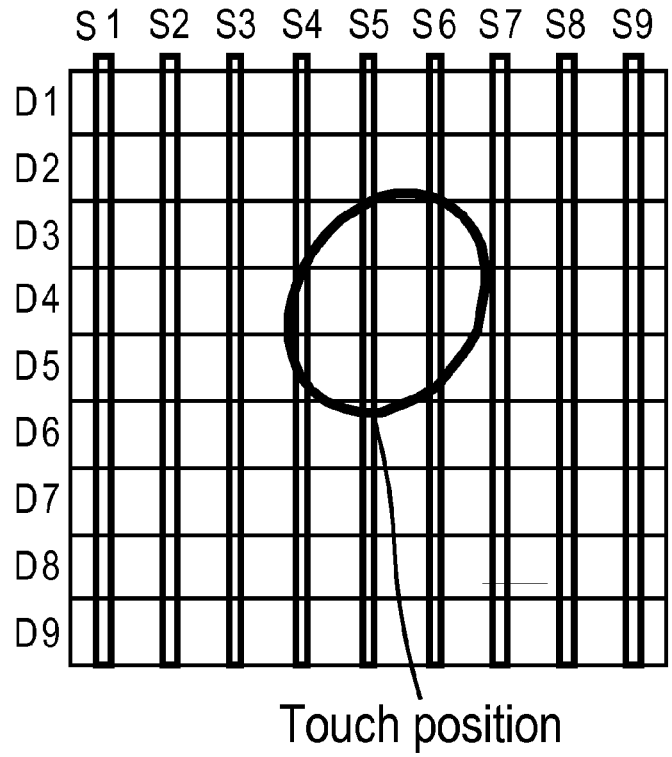
Figure 7:
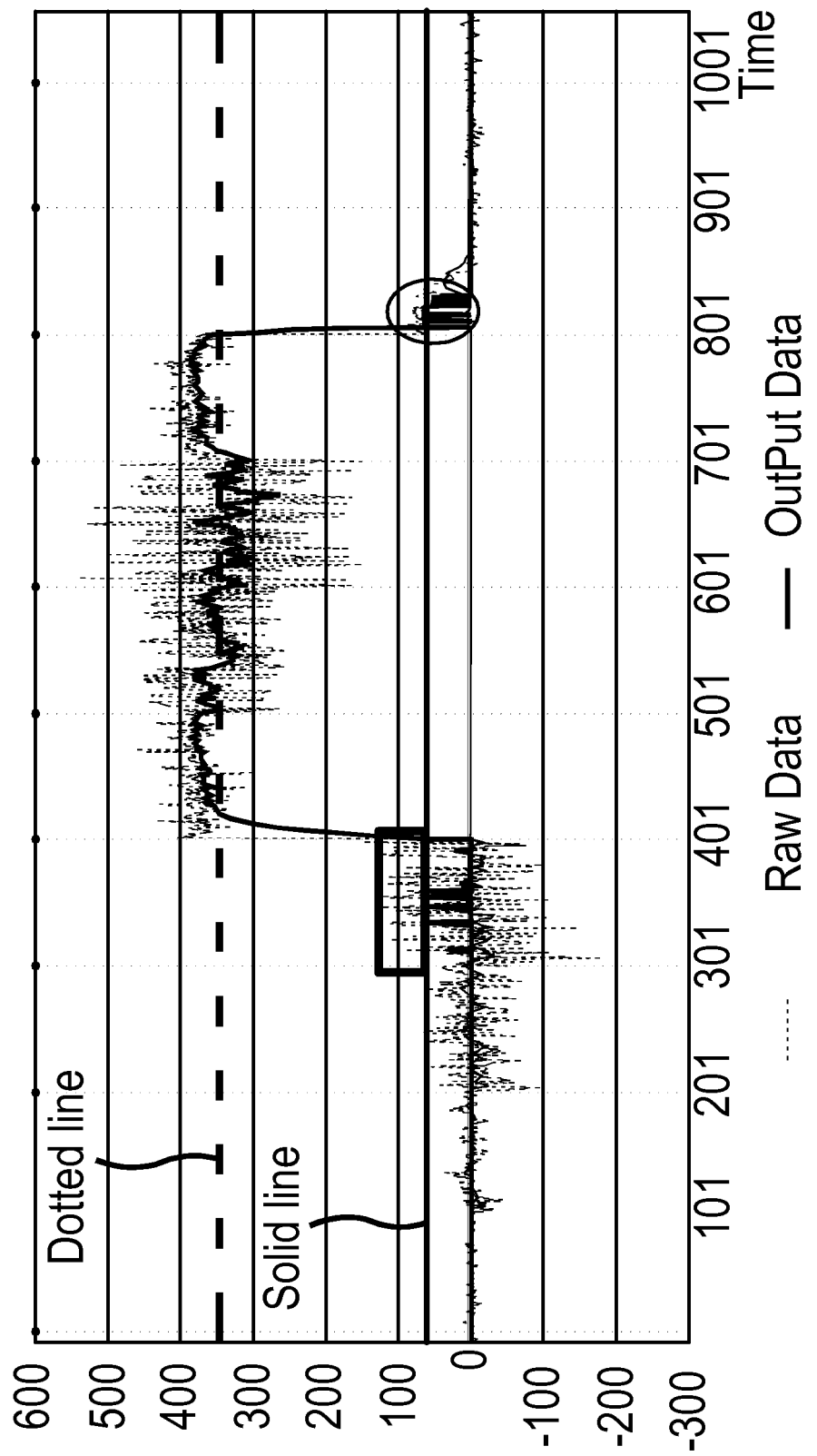
FIG. 7 schematically illustrates a continuous observation of raw data of a certain pixel at an intersection of X-axis and Y-axis on a touch panel for a period of time.
Figure 15:
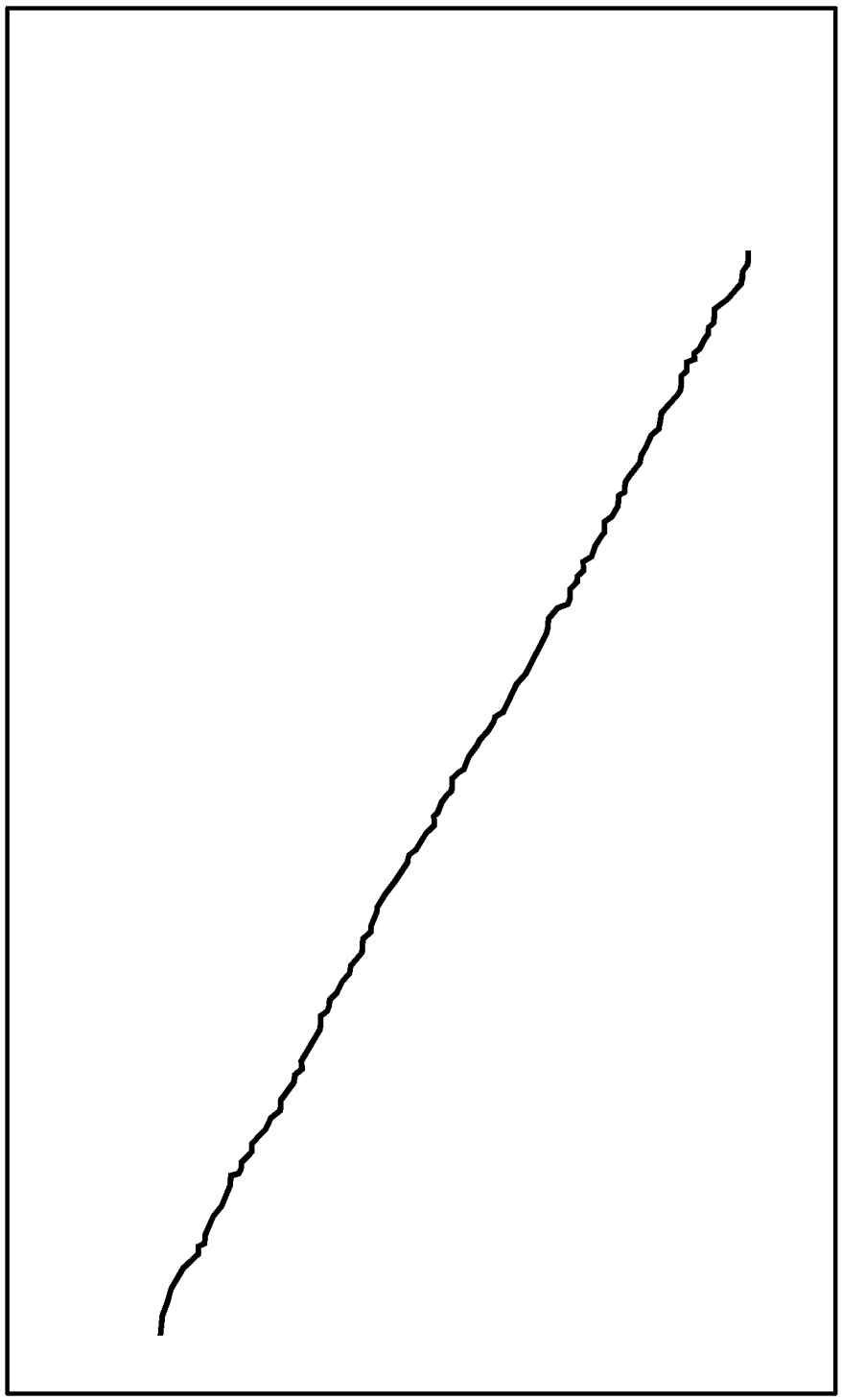
FIG. 15 schematically illustrates the data actually measured by the method of the present invention.

FIG. 15 schematically illustrates the data actually measured by the method of the present invention. By comparing FIG. 15 with FIG. 5, it is known that, in the present invention, there is no ladder-like non-linearity occurred when the touch position passes through the sensing lines as in the prior art. That is, the method of the present invention is able to increase the linearity of the raw data while preventing the raw data from being interfered by noises.

In the prior capacitive touch system, the touch position is likely to be influenced by the structure and electrode pattern of the touch panel. However, the electrode pattern of the capacitive touch panel is the core technology for each touch panel manufacturer, which cannot be freely used by other manufacturers. Therefore, based on the consideration of cost, many handheld touch devices still use those unsatisfactory capacitive touch panel structures and electrode patterns, which are defective in linearity exhibition. Accordingly, with the method of the present invention, the capacitive touch system is provided with increased linearity exhibition when using different touch panels.

Furthermore, it is difficult to change the situation that many system manufacturers still use unsatisfactory capacitive touch panel structures and electrode patterns. However, the method for improving linearity of touch system coordinates in accordance with the present invention can change the method of processing the two-dimensional raw data of touch panel in the prior capacitive touch control technique, so as to avoid noise influence and increase coordinate linearity exhibition for the capacitive touch system, thereby reducing the limitation on using different electrode patterns of capacitive touch panel. For the manufacturers that develop capacitive touch systems, the developed systems are not restricted by using different electrode patterns and all have excellent linearity exhibition, thereby effectively increasing the competitiveness and compatibility of the product.

The method of the present invention undertakes the original two-dimensional raw data obtained from the capacitive touch panel. In comparison, the prior art directly sets a threshold to determine whether there is effective touch. If measured data is not over the threshold, it is deemed as noise or small change, which will not be further processed. However, with the setting of decreased threshold, although the linearity exhibition of the raw data can be effectively improved, the other non-touch areas are likely to be influenced by noises, resulting in the problem of having unpredicted touch points (noise points). By considering the adjacent area, the present invention is able to not only effectively improve the linearity exhibition of the raw data but also avoid noise influence to the non-touch positions.

Although the present invention has been explained in relation to its preferred embodiment, it is to be understood that many other possible modifications and variations can be made without departing from the spirit and scope of the invention as hereinafter claimed.

What is claimed is:

1. A method for improving linearity of touch system coordinates applied in a capacitive multi-touch system including a capacitive touch panel and a control device, the method comprising the steps of:
   (A) the control device reading two-dimensional raw data from the capacitive touch panel;
   (B) the control device reading one pixel from the two-dimensional raw data and pixels adjacent to said read pixel, wherein the pixel value of said read pixel is p(i, j), and the pixels adjacent to said read pixel have pixel values of p(i−1, j−1), p(i, j−1), p(i+1, j−1), p(i−1, j), p(i+1, j), p(i−1, j+1), p(i, j+1), p(i+1, j+1), where i and j are indexes respectively;
   (C) the control device determining whether pixel value of said read pixel is greater than a predetermined value;
   (D) if the pixel value of said read pixel is not greater than the predetermined value, the control device further determining whether at least one of the pixels adjacent to said read pixel has a pixel value greater than the predetermined value;
   (E) if none of the pixels adjacent to said read pixel is greater than the predetermined value, the pixel value of said read pixel is set to be a first setting value;
   (F) the control device determining whether all pixels of the two-dimensional raw data have been processed and, if no, executing step (B); and
   (G) if all pixels of the two-dimensional raw data have been processed, the control device perform feature point capture on the two-dimensional raw data and, and then divide the two-dimensional raw data into at least one touch area which is assigned with an identification code.

2. The method for improving linearity of touch system coordinates as claimed in claim 1, further comprising a step of:
   (H) based on the identification code, the control device performing a coordinate conversion on the at least one touch area corresponding to the identification code so as to output a touch coordinate.

3. The method for improving linearity of touch system coordinates as claimed in claim 2, further comprising a step of:
   (I) when step (C) determines that the pixel value of said read pixel is greater than the predetermined value, the control device retaining the pixel value of said read pixel and then executing step (F).

4. The method for improving linearity of touch system coordinates as claimed in claim 3, wherein when step (D) determines that the pixels adjacent to said read pixel has a pixel value greater than the predetermined value, step (I) is executed.

5. The method for improving linearity of touch system coordinates as claimed in claim 4, wherein the two-dimensional raw data is obtained by mutual capacitance sensing technique.

6. The method for improving linearity of touch system coordinates as claimed in claim 2, wherein in step (H), a first-order momentum method is employed to perform coordinate conversion so as to output the corresponding touch coordinate.

7. The method for improving linearity of touch system coordinates as claimed in claim 1, wherein the capacitive touch panel includes M first conductor lines arranged in a first direction and N second conductor lines arranged in a second direction, where the first direction is perpendicular to the second direction, and M and N are positive integers respectively.

8. The method for improving linearity of touch system coordinates as claimed in claim 7, wherein the two-dimensional raw data has M×N pixels and said pixels has a pixel value of p(i, j), where i is in the range of 0 to (M−1), and j is in the range of 0 to (N−1).

* * * * *